(12) United States Patent
Kurita et al.

(10) Patent No.: US 11,773,797 B2
(45) Date of Patent: Oct. 3, 2023

(54) STATUS MONITORING DEVICE FOR SPEED REDUCER, AND SPEED REDUCING DEVICE

(71) Applicant: Nabtesco Corporation, Tokyo (JP)

(72) Inventors: Masakazu Kurita, Tokyo (JP); Hiroki Mori, Tokyo (JP); Koji Nakamura, Tokyo (JP); Kazuhiko Sakurai, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/197,646

(22) Filed: Mar. 10, 2021

(65) Prior Publication Data

US 2021/0324808 A1 Oct. 21, 2021

(30) Foreign Application Priority Data

Apr. 17, 2020 (JP) ................. 2020-073872

(51) Int. Cl.
*F16H 1/32* (2006.01)
*F02D 41/00* (2006.01)
*G01M 15/06* (2006.01)
*G08B 3/10* (2006.01)

(52) U.S. Cl.
CPC ........... *F02D 41/009* (2013.01); *G01M 15/06* (2013.01); *G08B 3/10* (2013.01); *F02D 41/0007* (2013.01)

(58) Field of Classification Search
CPC ...... F16H 1/32; F02D 41/009; F02D 41/0007; G01M 15/06; G08B 3/10
See application file for complete search history.

(56) References Cited

U.S. PATENT DOCUMENTS

| | | | | |
|---|---|---|---|---|
| 7,811,193 | B2* | 10/2010 | Nakamura | F16H 1/46 475/179 |
| 8,798,861 | B2* | 8/2014 | Mitsuhara | B62D 15/0245 701/41 |
| 11,187,300 | B2* | 11/2021 | Furuta | F16H 1/2863 |
| 11,353,090 | B2* | 6/2022 | Takahashi | F16H 1/2863 |
| 2019/0207472 | A1* | 7/2019 | Uematsu | F16H 61/32 |

FOREIGN PATENT DOCUMENTS

| | | |
|---|---|---|
| DE | 102017207844 A1 | 11/2017 |
| DE | 10-2019213960 A1 | 3/2020 |
| JP | 2008-292288 A | 12/2008 |

OTHER PUBLICATIONS

Extended European Search Report dated Nov. 29, 2021, issued in corresponding European Patent Application No. 21162337.6 (10 pgs.).

* cited by examiner

*Primary Examiner* — Gonzalo Laguarda
(74) *Attorney, Agent, or Firm* — Pillsbury Winthrop Shaw Pittman, LLP (57) ABSTRACT

Provided is a status monitoring device for a speed reducer, including: at least one signal transmission unit for monitoring a status of at least one crankshaft of a speed reducer and transmitting a status signal; and a determination unit for determining a status of the speed reducer based on the status signal from the at least one signal transmission unit.

9 Claims, 7 Drawing Sheets

STATUS MONITORING DEVICE FOR SPEED REDUCER, AND SPEED REDUCING DEVICE

CROSS-REFERENCE TO RELATED APPLICATIONS

This application is based on and claims the benefit of priority from Japanese Patent Application Serial No. 2020-073872 (filed on Apr. 17, 2020), the contents of which are hereby incorporated by reference in their entirety.

TECHNICAL FIELD

The present invention relates to a status monitoring device for a speed reducer, and a speed reducing device.

BACKGROUND

Speed reducers installed on devices such as robots conventionally include various sensors for status management and status diagnosis of the speed reducer. For example, Japanese Patent Application Publication No. 2008-292288 discloses a bearing diagnostic device for diagnosing abnormality in a bearing of a speed reducer. The bearing diagnostic device includes a vibration sensor for detecting vibration occurring in the speed reducer and outputting an analog electric signal. The vibration sensor is fixed to a portion of the speed reducer above the bearing by a magnet attachment or the like.

It is demanded to monitor the status of the speed reducer accurately.

SUMMARY

The present invention has been made to achieve the above challenge, and one object thereof is to provide a status monitoring device for a speed reducer capable of monitoring the status of the speed reducer accurately, and a speed reducing device.

(1) A status monitoring device for a speed reducer according to an aspect of the present invention comprises: at least one signal transmission unit for monitoring a status of at least one crankshaft of a speed reducer and transmitting a status signal; and a determination unit for determining a status of the speed reducer based on the status signal from the at least one signal transmission unit.

With this configuration, the signal transmission unit monitors the status of the crankshaft of the speed reducer, and therefore, the status of the speed reducer can be monitored more accurately than in the case where the status of the speed reducer is monitored externally of the speed reducer. In addition, the status of the speed reducer can be determined accurately by the determination unit for determining the status of the speed reducer based on the status signal from the signal transmission unit.

(2) In the status monitoring device for a speed reducer described in (1) above, it is also possible that the at least one crankshaft comprises a plurality of crankshafts, the at least one signal transmission unit monitors statuses of the plurality of crankshafts and transmits a plurality of signals, and the determination unit determines the status of the speed reducer by comparing the plurality of signals from the at least one signal transmitting unit.

(3) In the status monitoring device for a speed reducer described in (1) or (2) above, it is also possible that the at least one signal transmission unit transmits the status signal representing at least one of vibration, noise, temperature, and rotation of the at least one crankshaft.

(4) In the status monitoring device for a speed reducer described in any one of (1) to (3) above, it is also possible that the determination unit performs at least one of fault detection, life forecast, and fault prediction based on the status signal from the at least one signal transmission unit.

(5) In the status monitoring device for a speed reducer described in any one of (1) to (4) above, it is also possible that the at least one crankshaft of the speed reducer comprises a first crankshaft, a second crankshaft, and a third crankshaft, the at least one signal transmission unit comprises a plurality of signal transmission units, the plurality of signal transmission units include: a first signal transmission unit provided on the first crankshaft and configured to monitor a status of the first crankshaft and transmit a first signal; a second signal transmission unit provided on the second crankshaft and configured to monitor a status of the second crankshaft and transmit a second signal; and a third signal transmission unit provided on the third crankshaft and configured to monitor a status of the third crankshaft and transmit a third signal, and the determination unit calculates a plurality of signal differences based on the first signal, the second signal, and the third signal, and puts out a fault possibility signal when any one of the plurality of signal differences is equal to or larger than a threshold.

(6) In the status monitoring device for a speed reducer described in any one of (1) to (4) above, it is also possible that the at least one crankshaft of the speed reducer comprises a first crankshaft, a second crankshaft, and a third crankshaft, the at least one signal transmission unit comprises a plurality of signal transmission units, the plurality of signal transmission units include: a first signal transmission unit provided on the first crankshaft and configured to monitor a status of the first crankshaft and transmit a first signal; a second signal transmission unit provided on the second crankshaft and configured to monitor a status of the second crankshaft and transmit a second signal; and a third signal transmission unit provided on the third crankshaft and configured to monitor a status of the third crankshaft and transmit a third signal, and the determination unit calculates a plurality of signal differences based on the first signal, the second signal, and the third signal, and puts out a fault possibility signal when any two of the plurality of signal differences is equal to or larger than a threshold.

(7) A speed reducing device according to an aspect of the present invention comprises: a casing; a speed reducer disposed in an inner space of the casing; and a signal transmission unit for monitoring a status of the speed reducer and transmitting a status signal.

With this configuration, the signal transmission unit monitors the status of the speed reducer in the casing, and therefore, the status of the speed reducer can be monitored more accurately than in the case where the status of the speed reducer is monitored externally of the casing.

(8) A speed reducing device according to an aspect of the present invention comprises: a plurality of crankshafts of a speed reducer; and a plurality of signal transmission units each provided on corresponding one of the plurality of crankshafts and configured to monitor a status of the corresponding one of the plurality of crankshafts and transmit a status signal.

With this configuration, the signal transmission units monitor the statuses of the plurality of crankshafts of the speed reducer, and therefore, the status of the speed reducer can be monitored more accurately than in the case where the status of the speed reducer is monitored externally of the speed reducer.

(9) A speed reducing device according to an aspect of the present invention comprises: a first crankshaft of a speed reducer; a second crankshaft interlocking with the first crankshaft; a first signal transmission unit for monitoring a status of the first crankshaft and transmitting a first signal; and a second signal transmission unit for monitoring a status of the second crankshaft and transmitting a second signal.

With this configuration, the first signal transmission unit monitors the status of the first crankshaft of the speed reducer, and the second signal transmission unit monitors the status of the second crankshaft, and therefore, the status of the speed reducer can be monitored more accurately than in the case where the status of the speed reducer is monitored externally of the speed reducer.

(10) A status monitoring device for a speed reducer according to an aspect of the present invention is used for a speed reducer including a first member and a second member having a same shape, and the status monitoring device comprises: a first signal transmission unit for monitoring a status of the first member and transmitting a first signal; a second signal transmission unit for monitoring a status of the second member and transmitting a second signal; and a determination unit for determining a status of the speed reducer by comparing the first signal and the second signal.

With this configuration, the first signal transmission unit monitors the status of the first member of the speed reducer, and the second signal transmission unit monitors the status of the second member, and therefore, the status of the speed reducer can be monitored more accurately than in the case where the status of the speed reducer is monitored externally of the speed reducer.

(11) In the status monitoring device for a speed reducer described in (10) above, it is also possible that the first member and the second member interlock with each other.

(12) A speed reducing device according to an aspect of the present invention comprises: a casing; a speed reducer disposed in an inner space of the casing; at least one signal transmission unit for monitoring a status of the speed reducer and transmitting a status signal; and a determination unit for determining a status of the speed reducer based on the status signal from the at least one signal transmission unit, wherein the speed reducer includes a first crankshaft, a second crankshaft, and a third crankshaft having a same shape and interlocking with each other, wherein the at least one signal transmission unit comprises a plurality of signal transmission units, wherein the plurality of signal transmission units include: a first signal transmission unit provided on the first crankshaft and configured to monitor vibration of the first crankshaft and transmit a first signal; a second signal transmission unit provided on the second crankshaft and configured to monitor vibration of the second crankshaft and transmit a second signal; and a third signal transmission unit provided on the third crankshaft and configured to monitor vibration of the third crankshaft and transmit a third signal, and wherein the determination unit calculates a plurality of signal differences based on the first signal, the second signal, and the third signal, and puts out a fault possibility signal when any one of the plurality of signal differences is equal to or larger than a threshold.

With this configuration, the signal transmission units monitor the status of the speed reducer in the casing, and therefore, the status of the speed reducer can be monitored more accurately than in the case where the status of the speed reducer is monitored externally of the casing. In addition, in the speed reducer, the first crankshaft, the second crankshaft, and the third crankshaft having the same shape are compared with one another, and therefore, the status of the speed reducer can be determined more accurately than in the case where the crankshafts have different shapes. In addition, the first crankshaft, the second crankshaft, and the third crankshaft have the same shape and interlock with each other, and therefore, these crankshafts operate in the same manner. Through comparison between these crankshafts, the status of the speed reducer can be determined more accurately than in the case where the crankshafts operate independently of one another. In addition, the determination unit calculates a plurality of signal differences based on the first signal, the second signal, and the third signal, and puts out a fault possibility signal when any one of the plurality of signal differences is equal to or larger than the threshold, and therefore, the possibility of a fault can be predicted from the variation in vibration of one of the crankshafts.

(13) A speed reducing device according to an aspect of the present invention comprises: a casing; a speed reducer disposed in an inner space of the casing; at least one signal transmission unit for monitoring a status of the speed reducer and transmitting a status signal; and a determination unit for determining a status of the speed reducer based on the status signal from the at least one signal transmission unit, wherein the speed reducer includes a first crankshaft, a second crankshaft, and a third crankshaft having a same shape and interlocking with each other, wherein the at least one signal transmission unit comprises a plurality of signal transmission units, wherein the plurality of signal transmission units include: a first signal transmission unit provided on the first crankshaft and configured to monitor temperature of the first crankshaft and transmit a first signal; a second signal transmission unit provided on the second crankshaft and configured to monitor temperature of the second crankshaft and transmit a second signal; and a third signal transmission unit provided on the third crankshaft and configured to monitor temperature of the third crankshaft and transmit a third signal, and wherein the determination unit calculates a plurality of signal differences based on the first signal, the second signal, and the third signal, and puts out a fault possibility signal when any one of the plurality of signal differences is equal to or larger than a threshold.

With this configuration, the signal transmission units monitor the status of the speed reducer in the casing, and therefore, the status of the speed reducer can be monitored more accurately than in the case where the status of the speed reducer is monitored externally of the casing. In addition, in the speed reducer, the first crankshaft, the second crankshaft, and the third crankshaft having the same shape are compared with one another, and therefore, the status of the speed reducer can be determined more accurately than in the case where the crankshafts have different shapes. In addition, the first crankshaft, the second crankshaft, and the third crankshaft have the same shape and interlock with each other, and therefore, these crankshafts operate in the same manner. Through comparison between these crankshafts, the status of the speed reducer can be determined more accurately than in the case where the crankshafts operate independently of one another. In addition, the determination unit calculates a plurality of signal differences based on the first signal, the second signal, and the third signal, and puts out a fault possibility signal when any one of the plurality of signal differences is equal to or larger than the threshold, and therefore, the possibility of a fault can be predicted from the variation in temperature of one of the crankshafts.

(14) A speed reducing device according to an aspect of the present invention comprises: a casing; a speed reducer disposed in an inner space of the casing; at least one signal transmission unit for monitoring a status of the speed reducer and transmitting a status signal; and a determination unit for determining a status of the speed reducer based on the status signal from the at least one signal transmission unit, wherein the speed reducer includes a first crankshaft, a second crankshaft, and a third crankshaft having a same shape and interlocking with each other, wherein the at least one signal transmission unit comprises a plurality of signal transmission units, wherein the plurality of signal transmission units include: a first signal transmission unit provided on the first crankshaft and configured to monitor rotation of the first crankshaft and transmit a first signal; a second signal transmission unit provided on the second crankshaft and configured to monitor rotation of the second crankshaft and transmit a second signal; and a third signal transmission unit provided on the third crankshaft and configured to monitor rotation of the third crankshaft and transmit a third signal, and wherein the determination unit puts out a fault possibility signal in accordance with a condition of variation of the first signal, the second signal, and the third signal.

With this configuration, the signal transmission units monitor the status of the speed reducer in the casing, and therefore, the status of the speed reducer can be monitored more accurately than in the case where the status of the speed reducer is monitored externally of the casing. In addition, in the speed reducer, the first crankshaft, the second crankshaft, and the third crankshaft having the same shape are compared with one another, and therefore, the status of the speed reducer can be determined more accurately than in the case where the crankshafts have different shapes. In addition, the first crankshaft, the second crankshaft, and the third crankshaft have the same shape and interlock with each other, and therefore, these crankshafts operate in the same manner. Through comparison between these crankshafts, the status of the speed reducer can be determined more accurately than in the case where the crankshafts operate independently of one another. In addition, the determination unit puts out a fault possibility signal in accordance with the condition of variation of the first signal, the second signal, and the third signal, and therefore, the possibility of a fault can be predicted from the condition of variation of the signals.

Advantageous Effects

According to one or more aspects of the present invention, provided are a status monitoring device for a speed reducer capable of monitoring the status of the speed reducer accurately, and a speed reducing device.

DESCRIPTION OF THE EMBODIMENTS

Embodiments of the present invention will now be described with reference to the attached drawings. The following description of the embodiments is based on an example in which a speed reducing device is a gear transmission device including a status monitoring device for a speed reducer. In the drawings used for the following description, members are shown to different scales into recognizable sizes.

First Embodiment

Figure 1A:
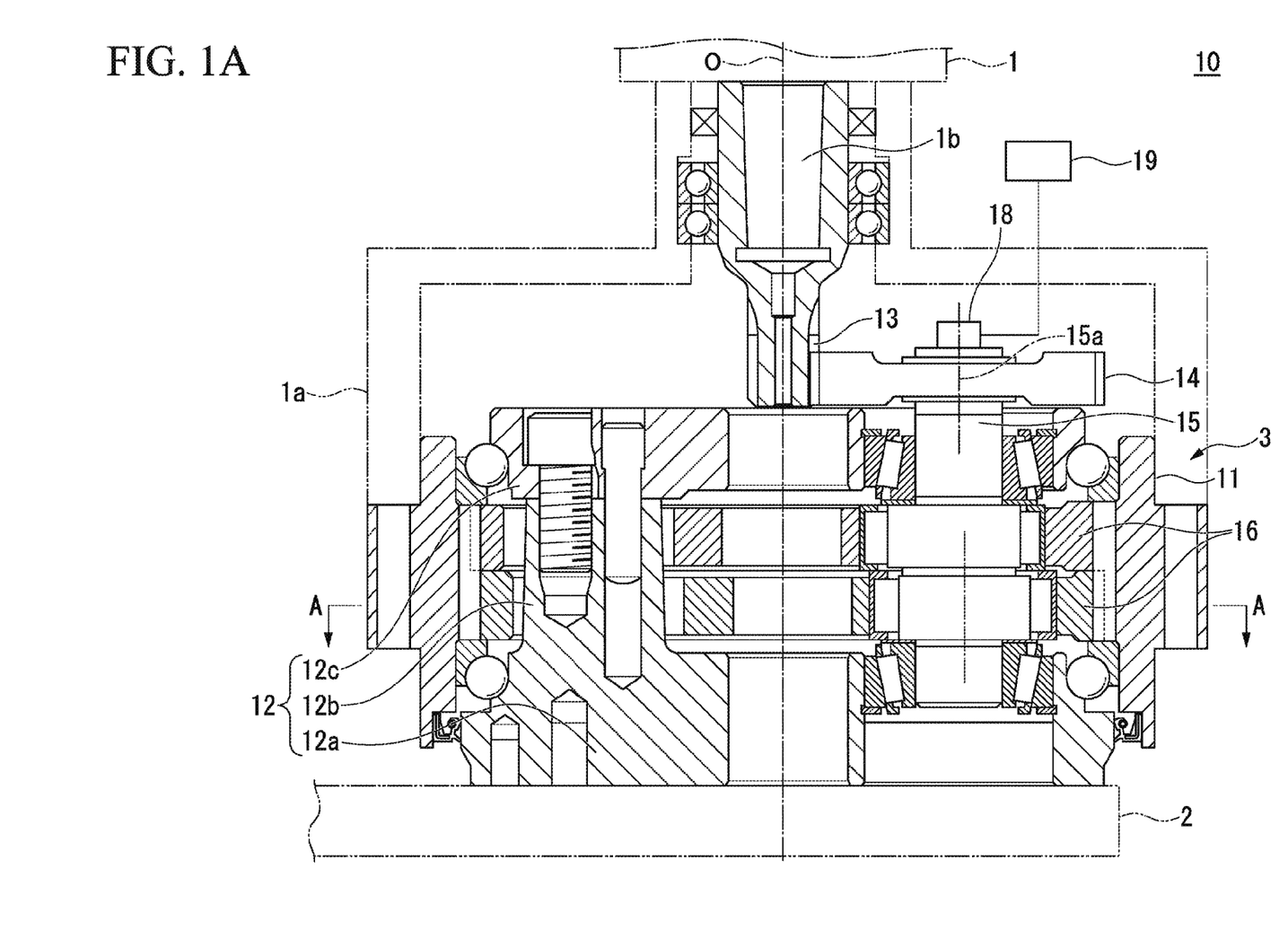
FIG. 1A is a partially cutaway view of a speed reducing device according to a first embodiment.
Figure 1B:
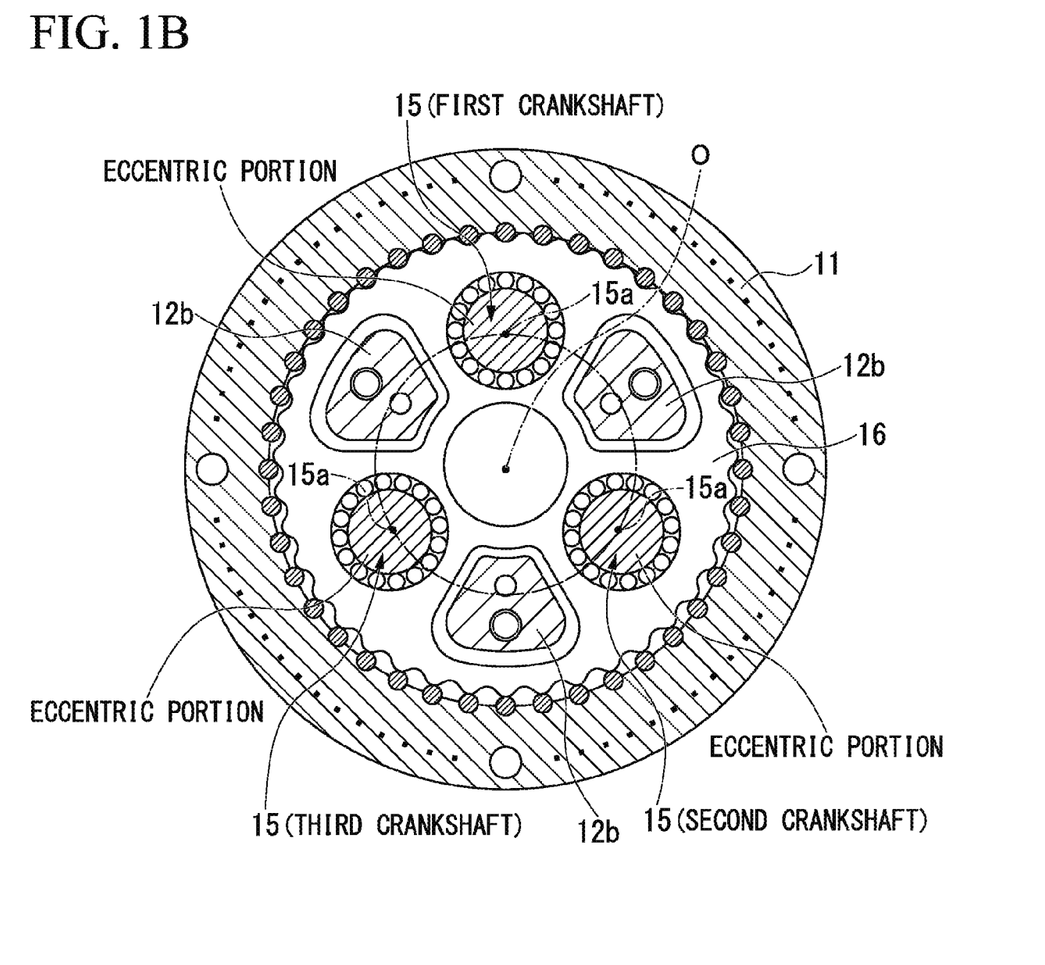
FIG. 1B is a sectional view along a line A-A in the FIG. 1A.

FIGS. 1A and 1B are partially cutaway views of a speed reducing device 10 according to a first embodiment. As shown in FIGS. 1A and 1B the speed reducing device 10 includes a speed reducer 3 disposed between a motor 1 and a robot arm 2. The speed reducing device 10 includes a casing 11, a carrier 12, an input gear 13, three transmission gears (spur gears) 14, three crankshafts 15, and a RV (Rotary Vector) gear 16.

In the speed reducing device 10, the RV gear 16 oscillates and rotates in association with the rotation of an eccentric portion (not shown) provided in each crankshaft 15. Thus, in the speed reducing device 10, the casing 11 and the carrier 12 rotate relative to each other so as to obtain decelerated output rotation from input rotation of the input gear 13 meshing with the transmission gears 14 connected to the corresponding crankshafts 15. The speed reducing device 10 is an eccentric oscillating gear transmission device.

The casing 11 is fixed to a motor housing 1a that houses the motor 1. The carrier 12 is fixed to the robot arm 2. The carrier 12 is supported in the casing 11 so as to be rotatable about a central axis O relative to the casing 11. For example, the space enclosed by the casing 11, the carrier 12, and the motor housing 1a stores a liquid lubricant.

The input gear 13 is connected to a rotary shaft 1b of the motor 1. The three transmission gears 14 mesh with the input gear 13. The three crankshafts 15 are connected to the three transmission gears 14, respectively. Each of the crankshafts 15 is supported so as to be rotatable about a respective central axis 15a relative to the carrier 12. The eccentric portion (not shown) of each crankshaft 15 is supported so as to be rotatable relative to the RV gear 16.

The RV gear 16 is meshed with a plurality of inner tooth pins (not shown) provided on the inner peripheral surface of the casing 11. The RV gear 16 moves eccentrically along with the eccentric portions in accordance with rotation of the crankshafts 15, so as to oscillate and rotate relative to the casing 11 while contacting with the inner tooth pins of the casing 11.

The carrier 12 includes a base portion 12a, three shaft portions 12b, and an end plate portion 12c. The base portion 12a and the three shaft portions 12b are formed integrally with each other. The three shaft portions 12b and the end plate portion 12c are fixed integrally with each other via fastening members. The shaft portions 12b each extend through a through-hole (not shown) formed in the RV gear 16 in the axial direction parallel to the central axis O, in such a manner as to have some play. The carrier 12 rotates about the central axis O relative to the casing 11 in accordance with the oscillation and rotation of the RV gear 16.

The speed reducing device 10 includes signal transmission units 18 and a control device 19 (determination unit), in addition to the speed reducer 3. The signal transmission units 18 are disposed in the space enclosed by the casing 11, the carrier 12, and the motor housing 1*a*. The signal transmission units 18 monitor the status of the speed reducer 3 and transmit a status signal. A plurality of signal transmission units 18 are provided, one each for the three crankshafts 15. The three crankshafts 15 have the same shape. The three crankshafts 15 are a first crankshaft, a second crankshaft, and a third crankshaft that interlock with each other. Since the three crankshafts 15 have the same shape and interlock with each other, these crankshafts 15 operate in the same manner.

The plurality of signal transmission units 18 are a first signal transmission unit provided on the first crankshaft, a second signal transmission unit provided on the second crankshaft, and a third signal transmission unit provided on the third crankshaft. For example, signals are propagated from the crankshafts 15 each operating as a rotational body, by methods using wireless communication or methods using a rotatable connector such as a slip ring.

The first signal transmission unit includes an acceleration sensor (hereinafter also referred to as "the first acceleration sensor") attached directly to the axial end surface of the first crankshaft. The first signal transmission unit performs appropriate signal processing on a measurement result from the first acceleration sensor to obtain vibration of the first crankshaft. The first signal transmission unit monitors the vibration of the first crankshaft and transmits a first signal.

The second signal transmission unit includes an acceleration sensor (hereinafter also referred to as "the second acceleration sensor") attached directly to the axial end surface of the second crankshaft. The second signal transmission unit performs appropriate signal processing on a measurement result from the second acceleration sensor to obtain vibration of the second crankshaft. The second signal transmission unit monitors the vibration of the second crankshaft and transmits a second signal.

The third signal transmission unit includes an acceleration sensor (hereinafter also referred to as "the third acceleration sensor") attached directly to the axial end surface of the third crankshaft. The third signal transmission unit performs appropriate signal processing on a measurement result from the third acceleration sensor to obtain vibration of the third crankshaft. The third signal transmission unit monitors the vibration of the third crankshaft and transmits a third signal.

In the embodiment, all the crankshafts 15 of the speed reducer 3 have an acceleration sensor installed thereon. Since the acceleration sensors are attached directly to the target crankshafts 15, the vibration can be measured effectively for all the crankshafts 15. The status signals from the signal transmission units 18 are input to the control device 19.

The control device 19 is a software function unit that operates by a processor such as CPU (central processing unit) executing a program. The software function unit is an ECU (electronic control unit) including a processor such as CPU, a ROM (read only memory) storing a program, a RAM (random access memory) temporarily storing data, and an electronic circuit such as a timer. At least a part of the control device 19 may be an integrated circuit such as LSI (large scale integration).

The control device 19 determines the status of the speed reducer 3 based on the status signals from the signal transmission units 18. The control device 19 determines the status of the speed reducer 3 by comparing the status signals (the first signal, the second signal, and the third signal) from the signal transmission units 18. The control device 19 detects a fault, forecasts life, and predicts a fault based on the status signals from the signal transmission units 18. For example, the control device 19 diagnoses a fault of the speed reducer 3 and sets the timing of replacement.

The control device 19 stores reference frequency data obtained by a vibration measurement test previously performed on the speed reducer 3. The reference frequency data is, for example, frequency distribution map data obtained by the signal transmission units 18 (the acceleration sensors) for a plurality of predetermined operation statuses of the speed reducer 3. The plurality of predetermined operation statuses are, for example, no load, a rated torque, and predetermined torques exceeding the rated torque (for example, a number of times the rated torque). The control device 19 determines the status of the speed reducer 3 by comparing the frequency data obtained by the signal transmission units 18 during operation of the speed reducer 3 with the reference frequency data.

The dominant mode of faults in the speed reducer is a fault (breakage) caused by fatigue of a crankshaft. If the speed reducer includes a plurality of crankshafts, it is very rare that a plurality of crankshafts break at the same time due to the end of their lives. Typically, one of the plurality of crankshafts breaks, and while this breakage progresses, another crankshaft starts to break.

For example, supposing the speed reducer 3 includes three crankshafts 15, one of the crankshafts 15 starts to break. The acceleration data (vibration data) of one of the crankshafts 15 exhibits difference in amplitude and frequency from those of the other two crankshafts 15. Therefore, it can be determined that the speed reducer 3 has a fault. Since the status of the speed reducer 3 is determined by relative comparison between crankshafts 15, the reference data (reference frequency data) according to the operation status of the speed reducer 3 is constantly available. This makes it possible to detect a fault without need of information such as the rotation speed or the output torque of the crankshafts 15. It is also possible to provide a threshold for the acceleration data or the difference in the acceleration data, thereby to put out stepwise alerts in accordance with the progression of the fault in the speed reducer 3.

In the embodiment, the control device 19 calculates a plurality of signal differences based on the first signal, the second signal, and the third signal, and puts out a fault possibility signal when any one of the plurality of signal differences is equal to or larger than the threshold. The plurality of signal differences are, for example, the difference between the first signal and the second signal (such as the difference in amplitude), the difference between the second signal and the third signal (such as the difference in amplitude), and the difference between the third signal and the first signal (such as the difference in amplitude). The fault possibility signal indicates the possibility of a fault in the speed reducer 3. For example, the control device 19 may emit an alert sound as the fault possibility signal through a speaker (not shown).

Figure 2:
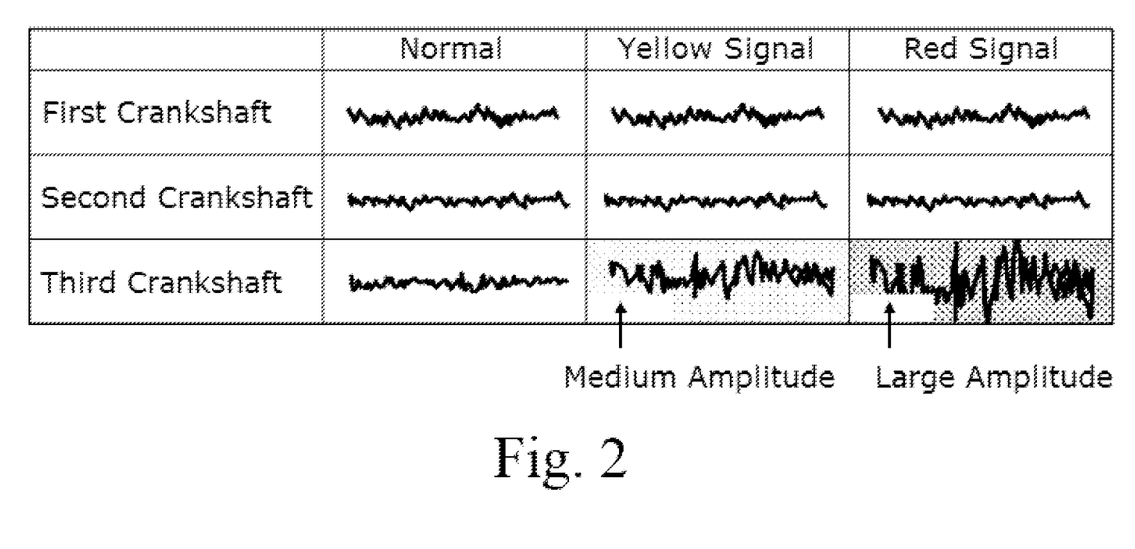
FIG. 2 shows an example of phase waveforms of vibration occurring in crankshafts of the first embodiment.

FIG. 2 shows an example of phase waveforms of vibration occurring in the crankshafts of the first embodiment. As shown in FIG. 2, in normal operation, the first crankshaft, the second crankshaft, and the third crankshaft vibrate at an amplitude smaller than the threshold.

When the difference in amplitude between the third signal as the status signal of the third crankshaft and the first signal as the status signal of the first crankshaft is equal to or larger than a predetermined threshold (hereinafter also referred to as "the first threshold"), the control device 19 outputs a yellow signal (first alert). In other words, when the third signal represents a caution amplitude (the medium amplitude in FIG. 2) larger than the normal amplitude, the control device 19 outputs the yellow signal (first alert). FIG. 2 shows the waveform causing the yellow signal in a dot hatch pattern.

When the difference in amplitude between the third signal and the first signal is equal to or larger than a threshold exceeding the first threshold (hereinafter also referred to as "the second threshold"), the control device 19 outputs a red signal (second alert). In other words, when the third signal represents a danger amplitude (the large amplitude in FIG. 2) larger than the caution amplitude, the control device 19 outputs the red signal (second alert). FIG. 2 shows the waveform causing the red signal in a dot hatch pattern thicker than for the yellow signal. With the first threshold and the second threshold, stepwise alerts (the yellow signal and the red signal) can be output in accordance with the progression of the fault in the third crankshaft.

As described above, the speed reducing device 10 according to the embodiment includes, the casing 11, the speed reducer 3 disposed in the inner space of the casing 11, the signal transmission units 18 for monitoring the status of the speed reducer 3 and transmitting a status signal, and the control device 19 for determining the status of the speed reducer 3 based on the status signal from the signal transmission units 18. The speed reducer 3 includes the first crankshaft, the second crankshaft, and the third crankshaft that have the same shape and interlock with each other. The signal transmission units 18 include a plurality of signal transmission units 18. The plurality of signal transmission units 18 include the first signal transmission unit provided on the first crankshaft and configured to monitor the vibration of the first crankshaft and transmit the first signal, the second signal transmission unit provided on the second crankshaft and configured to monitor the vibration of the second crankshaft and transmit the second signal, and the third signal transmission unit provided on the third crankshaft and configured to monitor the vibration of the third crankshaft and transmit the third signal. The control device 19 calculates a plurality of signal differences based on the first signal, the second signal, and the third signal and puts out the fault possibility signal when any one of the signal differences is equal to or larger than the threshold.

With the above configuration, the signal transmission units 18 monitor the status of the speed reducer 3 in the casing 11, and therefore, the status of the speed reducer 3 can be monitored more accurately than in the case where the status of the speed reducer 3 is monitored externally of the casing 11. In addition, in the speed reducer 3, the first crankshaft, the second crankshaft, and the third crankshaft having the same shape are compared with one another, and therefore, the status of the speed reducer 3 can be determined more accurately than in the case where the crankshafts have different shapes. In addition, the first crankshaft, the second crankshaft, and the third crankshaft have the same shape and interlock with each other, and therefore, these crankshafts operate in the same manner. Through comparison between these crankshafts, the status of the speed reducer 3 can be determined more accurately than in the case where the crankshafts operate independently of one another. In addition, the control device 19 calculates a plurality of signal differences based on the first signal, the second signal, and the third signal, and puts out a fault possibility signal when any one of the plurality of signal differences is equal to or larger than the threshold, and therefore, the possibility of a fault can be predicted from the variation in vibration of one of the crankshafts 15.

The foregoing description of the embodiment is based on an example in which each of the signal transmission units 18 includes an acceleration sensor attached directly to the axial end surface of the corresponding crankshaft 15, but this is not limitative. For example, the acceleration sensor may be attached to an end surface of the corresponding transmission gear 14. For example, the acceleration sensor may be built in to the crankshaft 15. For example, the acceleration sensor may be attached to a support member such as a hold flange, or a portion in the vicinity of an insertion hole (crank hole) of the crankshaft 15. For example, each of the signal transmission units 18 may include a vibration sensor, in place of the acceleration sensor.

The foregoing description of the embodiment is based on an example in which each of the signal transmission units 18 transmits the status signal representing the vibration of the crankshaft 15, but this is not limitative. For example, the signal transmission unit 18 may transmit a status signal representing the noise, temperature, rotation or the like of the crankshaft 15. For example, the signal transmission unit 18 may transmit a status signal representing at least one of the vibration, noise, temperature, and rotation of the crankshaft 15.

Second Embodiment

Figure 3:
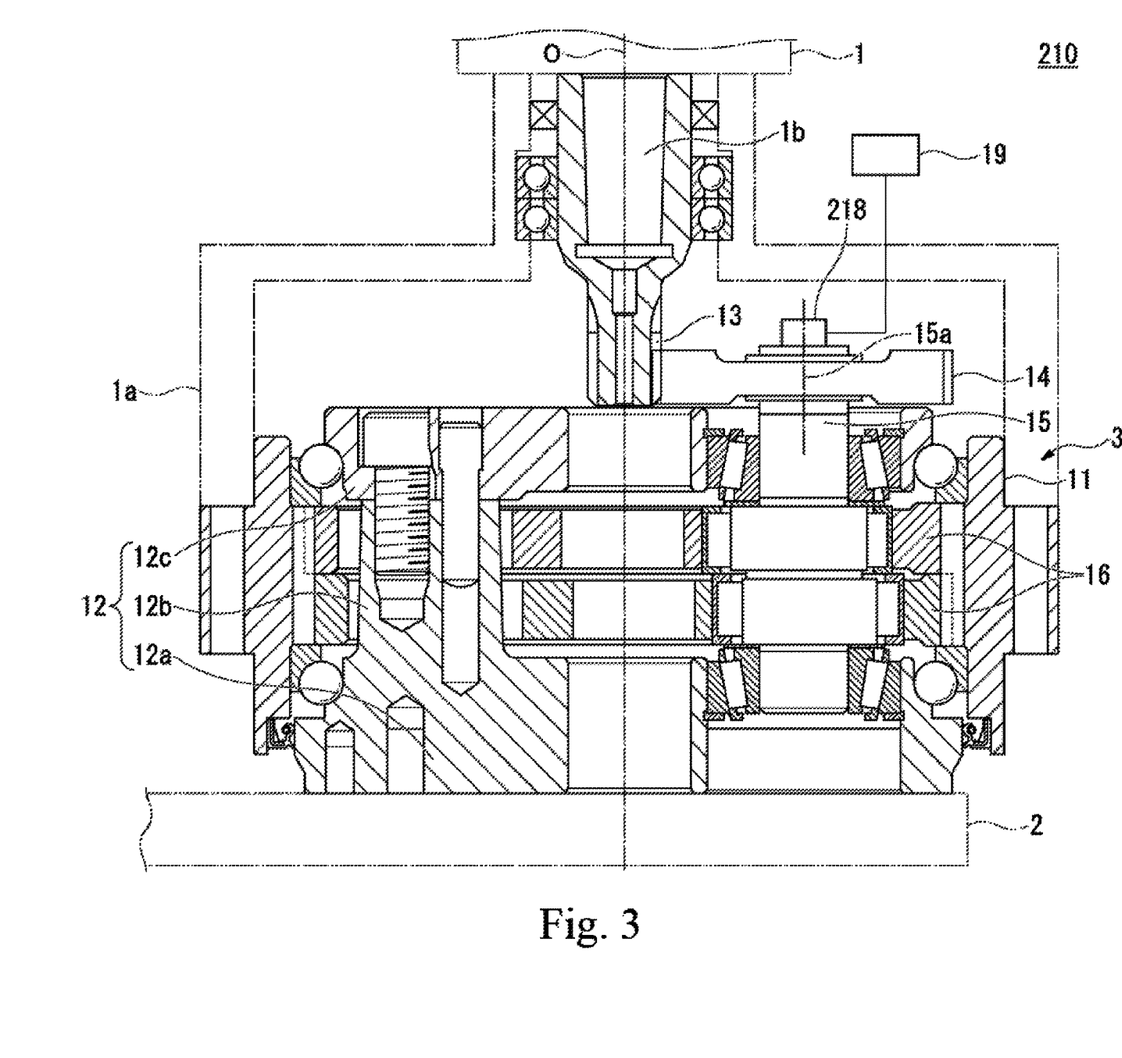
FIG. 3 is a partially cutaway view of a speed reducing device according to a second embodiment.

FIG. 3 is a partially cutaway view of a speed reducing device 210 according to a second embodiment. The foregoing description of the first embodiment is based on an example in which each of the signal transmission units 18 monitors the vibration of the corresponding crankshaft 15 and transmits the status signal, but this is not limitative. For example, each of signal transmission units 218 may monitor the temperature of the corresponding crankshaft 15 and transmit the status signal. In FIG. 3, the same elements as in the first embodiment are denoted by the same reference numerals and detailed descriptions thereof will be omitted.

As shown in FIG. 3, the speed reducing device 210 includes the signal transmission units 218 and the control device 19, in addition to the speed reducer 3. The signal transmission units 218 are disposed in the space enclosed by the casing 11, the carrier 12, and the motor housing 1a. A plurality of signal transmission units 218 are provided. The plurality of signal transmission units 218 are a first signal transmission unit provided on the first crankshaft, a second signal transmission unit provided on the second crankshaft, and a third signal transmission unit provided on the third crankshaft. For example, signals are propagated from the crankshafts 15 each operating as a rotational body, by methods using wireless communication or methods using a rotatable connector such as a slip ring.

The first signal transmission unit includes a temperature sensor (hereinafter also referred to as "the first temperature sensor") attached directly to the axial end surface of the first crankshaft. The first signal transmission unit monitors the temperature of the first crankshaft and transmits a first signal. The second signal transmission unit includes a temperature sensor (hereinafter also referred to as "the second temperature sensor") attached directly to the axial end surface of the second crankshaft. The second signal transmission unit monitors the temperature of the second crankshaft and transmits a second signal. The third signal transmission unit includes a temperature sensor (hereinafter also referred to as "the third temperature sensor") attached directly to the axial end surface of the third crankshaft. The third signal transmission unit monitors the temperature of the third crankshaft and transmits a third signal.

In the embodiment, all the crankshafts 15 of the speed reducer 3 have a temperature sensor installed thereon. Since the temperature sensors are attached directly to the target crankshafts 15, the temperature can be measured effectively for all the crankshafts 15. The status signals from the signal transmission units 218 are input to the control device 19.

The control device 19 stores reference temperature data obtained by a temperature measurement test previously performed on the speed reducer 3. The reference temperature data is, for example, temperature distribution map data obtained by the signal transmission units 218 (the temperature sensors) for a plurality of predetermined operation statuses of the speed reducer 3. The control device 19 determines the status of the speed reducer 3 by comparing the temperature data obtained by the signal transmission units 218 during operation of the speed reducer 3 with the reference temperature data.

For example, supposing the speed reducer includes three crankshafts 15, one of the crankshafts 15 starts to break. The rolling resistance of one of the crankshafts 15 increases, and thus the temperature of one of the crankshafts 15 rises above those of the other two crankshafts 15. Therefore, it can be determined that the speed reducer 3 has a fault. Since the temperature of the component being broken is measured directly, the fault can be detected earlier and more securely than in the case where the surface temperature of the speed reducer 3 is measured. Since the status of the speed reducer 3 is determined by relative comparison between crankshafts 15, the reference data (reference temperature data) according to the operation status of the speed reducer 3 is constantly available. This makes it possible to detect the fault less influenced by the operation status of the speed reducer 3. It is also possible to provide a threshold for the temperature data or the difference in the temperature data, thereby to put out stepwise alerts in accordance with the progression of the fault in the speed reducer 3.

In the embodiment, the control device 19 calculates a plurality of signal differences based on the first signal, the second signal, and the third signal, and puts out a fault possibility signal when any one of the plurality of signal differences is equal to or larger than the threshold. The plurality of signal differences are, for example, the difference between the first signal and the second signal (such as the difference in temperature), the difference between the second signal and the third signal (such as the difference in temperature), and the difference between the third signal and the first signal (such as the difference in temperature).

Figure 4:
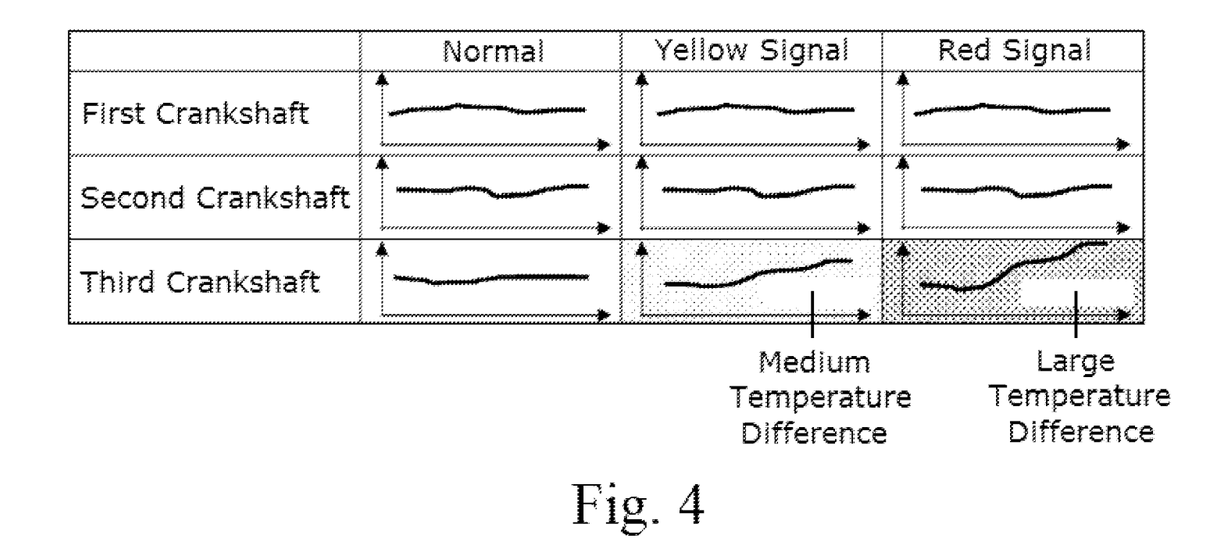
FIG. 4 shows an example of phase waveforms of temperature in crankshafts of the second embodiment.

FIG. 4 shows an example of phase waveforms of temperature in crankshafts of the second embodiment. In FIG. 4, the horizontal axis for each waveform represents time, and the vertical axis represents temperature. As shown in FIG. 4, in normal operation, the first crankshaft, the second crankshaft, and the third crankshaft have a temperature lower than the threshold.

When the difference in temperature between the third signal as the status signal of the third crankshaft and the first signal as the status signal of the first crankshaft is equal to or larger than a predetermined threshold (hereinafter also referred to as "the first temperature threshold"), the control device 19 outputs a yellow signal (first alert). In other words, when the third signal represents a caution temperature (the medium temperature difference in FIG. 4) higher than the normal temperature, the control device 19 outputs the yellow signal (first alert). FIG. 4 shows the waveform causing the yellow signal in a dot hatch pattern.

When the difference in temperature between the third signal and the first signal is equal to or larger than a threshold exceeding the first temperature threshold (hereinafter also referred to as "the second temperature threshold"), the control device 19 outputs a red signal (second alert). In other words, when the third signal represents a danger temperature (the large temperature difference in FIG. 4) higher than the caution temperature, the control device 19 outputs the red signal (second alert). FIG. 4 shows the waveform causing the red signal in a dot hatch pattern thicker than for the yellow signal. With the first temperature threshold and the second temperature threshold, stepwise alerts (the yellow signal and the red signal) can be output in accordance with the progression of the fault in the third crankshaft.

With this configuration, the control device 19 calculates a plurality of signal differences based on the first signal, the second signal, and the third signal, and puts out a fault possibility signal when any one of the plurality of signal differences is equal to or larger than the threshold, and therefore, the possibility of a fault can be predicted from the variation in temperature of one of the crankshafts 15.

The foregoing description of the second embodiment is based on an example in which each of the signal transmission units 218 includes a temperature sensor attached directly to the axial end surface of the corresponding crankshaft 15, but this is not limitative. For example, the temperature sensor may be attached to an end surface of the corresponding transmission gear 14. For example, the temperature sensor may be built in to the crankshaft 15. For example, the temperature sensor may be attached to a support member such as a hold flange, or a portion in the vicinity of an insertion hole (crank hole) of the crankshaft 15.

Third Embodiment

Figure 5:
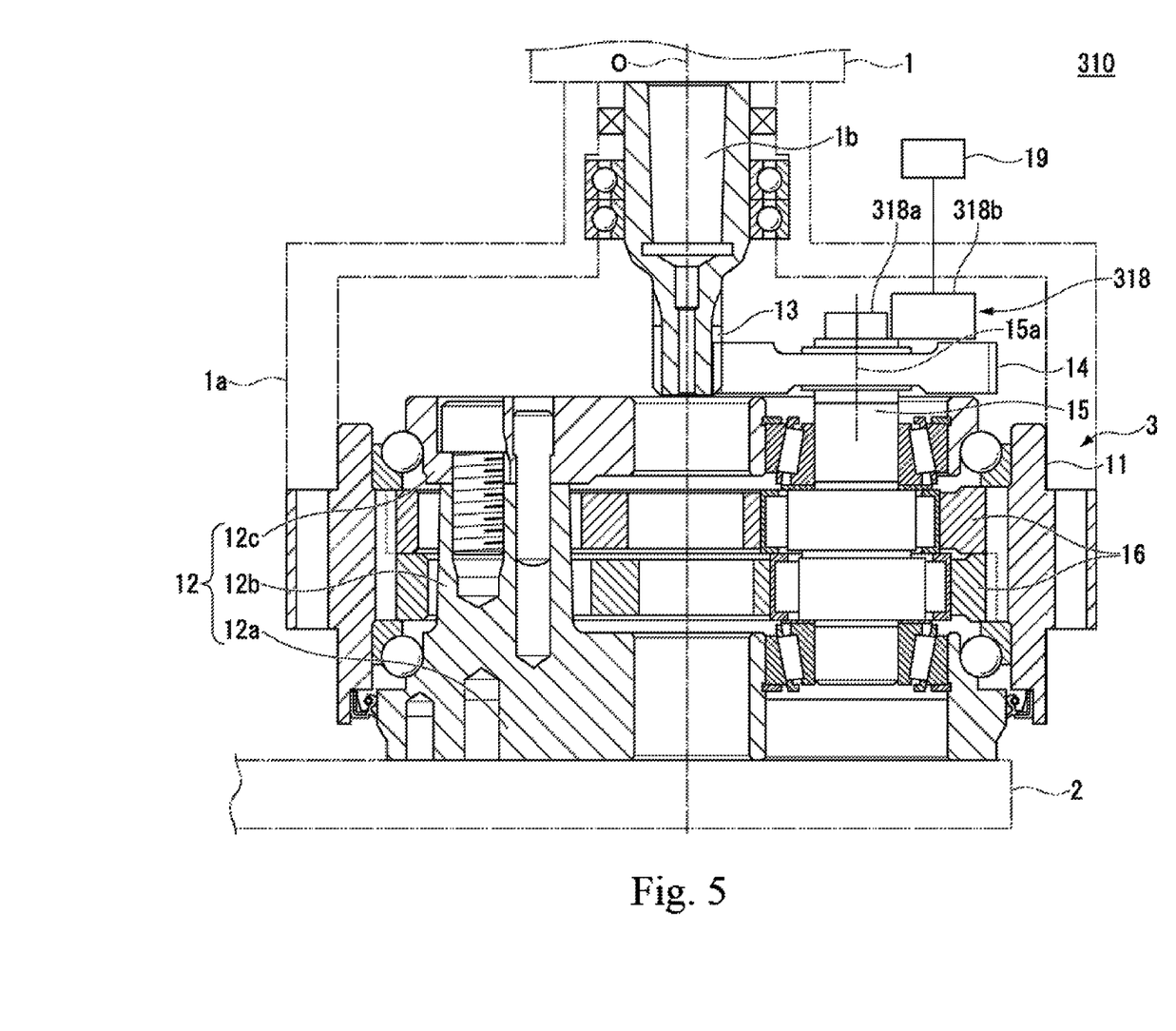
FIG. 5 is a partially cutaway view of a speed reducing device according to a third embodiment.

FIG. 5 is a partially cutaway view of a speed reducing device 310 according to a third embodiment. The foregoing description of the first embodiment is based on an example in which each of the signal transmission units 18 monitors the vibration of the corresponding crankshaft 15 and transmits the status signal, but this is not limitative. For example, each of signal transmission units 318 may monitor the rotation of the corresponding crankshaft 15 and transmit the status signal. In FIG. 5, the same elements as in the first embodiment are denoted by the same reference numerals and detailed descriptions thereof will be omitted.

As shown in FIG. 5, the speed reducing device 310 includes the signal transmission units 318 and the control device 19, in addition to the speed reducer 3. The signal transmission units 318 are disposed in the space enclosed by the casing 11, the carrier 12, and the motor housing 1a. A plurality of signal transmission units 318 are provided. The plurality of signal transmission units 318 are a first signal transmission unit provided on the first crankshaft, a second signal transmission unit provided on the second crankshaft, and a third signal transmission unit provided on the third crankshaft. For example, each of the signal transmission units 318 includes a rotation sensor having a magnet 318a and a magnetic sensor 318b. The rotation sensor obtains magnetic data for one cycle of sine curve in accordance with one rotation of the corresponding crankshaft 15.

The first signal transmission unit includes a rotation sensor (hereinafter also referred to as "the first rotation sensor") attached directly to the axial end surface of the first crankshaft. The first signal transmission unit monitors the rotation of the first crankshaft and transmits a first signal. The second signal transmission unit includes a rotation sensor (hereinafter also referred to as "the second rotation sensor") attached directly to the axial end surface of the second crankshaft. The second signal transmission unit monitors the rotation of the second crankshaft and transmits a second signal. The third signal transmission unit includes a rotation sensor (hereinafter also referred to as "the third rotation sensor") attached directly to the axial end surface of the third crankshaft. The third signal transmission unit monitors the rotation of the third crankshaft and transmits a third signal.

In the embodiment, all the crankshafts 15 of the speed reducer 3 have a rotation sensor installed thereon. Since the rotation sensors are attached directly to the target crankshafts 15, the rotation (magnetism) can be measured effectively for all the crankshafts 15. The status signals from the signal transmission units are input to the control device 19.

The control device 19 stores reference magnetic data obtained by a rotation (magnetism) measurement test previously performed on the speed reducer 3. The reference magnetic data is, for example, magnetic distribution map data obtained by the signal transmission units 318 (the rotation sensors) for a plurality of predetermined operation statuses of the speed reducer 3. The control device 19 determines the status of the speed reducer 3 by comparing the magnetic data obtained by the signal transmission units 318 during operation of the speed reducer 3 with the reference magnetic data.

For example, supposing the speed reducer includes three crankshafts 15, one of the crankshafts 15 starts to break. Due to irregular rotation, the magnetic data of one of the crankshafts 15 is varied as compared to those of the other two crankshafts 15. Therefore, it can be determined that the speed reducer 3 has a fault. Since the status of the speed reducer 3 is determined by relative comparison between crankshafts 15, the reference data (reference magnetic data) according to the operation status of the speed reducer 3 is constantly available, and thus detection of a fault is facilitated. Further, stepwise alerts can be output as the fault in the speed reducer 3 progresses in accordance with the number of broken crankshafts 15 and the condition of variation of the magnetic data. The variation of the magnetic data includes phase shifting, strain, and amplitude variation. The variation of the magnetic data is detected and determined based on the signals from the crankshafts 15 in a relative manner.

In the embodiment, the control device 19 puts out fault possibility signals stepwise in accordance with the condition of variation of the first signal, the second signal, and the third signal. For example, the control device 19 puts out a first fault possibility signal when any one of the first signal, the second signal, and the third signal is varied. For example, the control device 19 puts out a second fault possibility signal when any two of the first signal, the second signal, and the third signal are varied.

Figure 6:
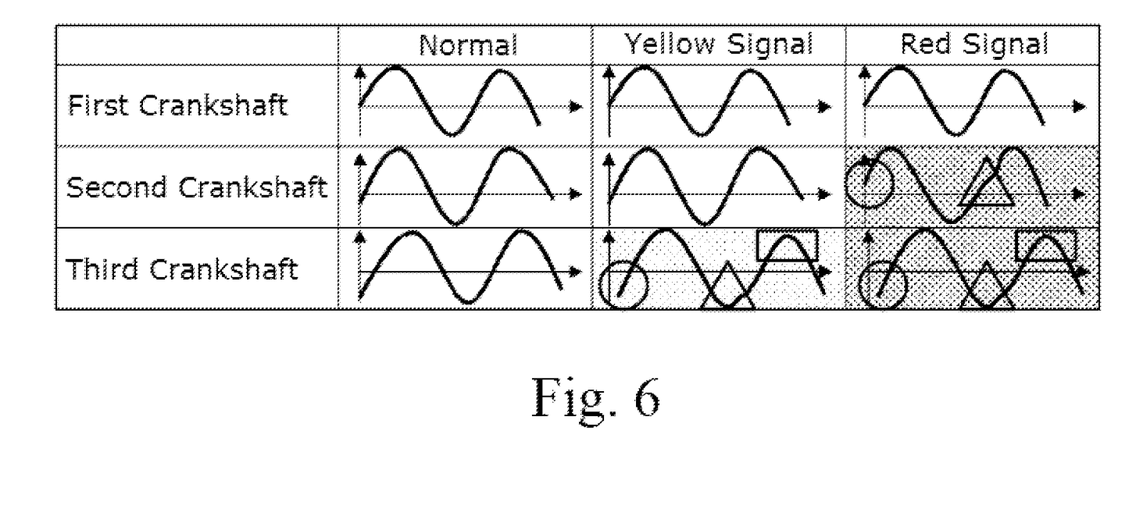
FIG. 6 shows an example of phase waveforms of rotation of crankshafts of the second embodiment.

FIG. 6 shows an example of phase waveforms of rotation of crankshafts of the third embodiment. In FIG. 6, the horizontal axis for each waveform represents time, and the vertical axis represents amplitude. As shown in FIG. 6, in normal operation, the first crankshaft, the second crankshaft, and the third crankshaft have almost no variation of the magnetic data.

When the third signal as the status signal of the third crankshaft (the magnetic data of the third crankshaft) is varied, the control device 19 outputs a yellow signal (first alert). In other words, when only the third signal among the first signal, the second signal, and the third signal is varied, the control device 19 outputs a yellow signal (first alert). FIG. 6 shows the waveform causing the yellow signal in a dot hatch pattern. In the example shown in FIG. 6, the third crankshaft undergoes phase shifting (the portion enclosed by a circle), strain (the portion enclosed by a triangle), and amplitude variation (the portion enclosed by a square) caused by irregular rotation.

When the second signal as the status signal of the second crankshaft (the magnetic data of the second crankshaft) is varied in addition to the third signal as the status signal of the third crankshaft (the magnetic data of the third crankshaft), the control device 19 outputs a red signal (second alert). In other words, when the second signal and the third signal among the first signal, the second signal, and the third signal are varied, the control device 19 outputs a red signal (second alert). FIG. 6 shows the waveforms causing the red signal in a dot hatch pattern thicker than for the yellow signal. In the example shown in FIG. 6, the second crankshaft undergoes phase shifting (the portion enclosed by a circle) and strain (the portion enclosed by a triangle) caused by irregular rotation. Such variation of the magnetic data (the phase shifting, strain, amplitude variation or the like caused by irregular rotation of the crankshaft 15) makes it possible to output stepwise alerts (yellow signal, red signal and the like) in accordance with the number of broken crankshafts 15 and the condition of variation of the magnetic data.

In the embodiment, the control device 19 puts out fault possibility signals in accordance with the condition of variation of the first signal, the second signal, and the third signal, and therefore, the possibility of a fault can be predicted from the condition of variation of the signals.

The foregoing description of the third embodiment is based on an example in which each of the signal transmission units 318 includes the rotation sensor having the magnet 318a and the magnetic sensor 318b, but this is not limitative. For example, the rotation sensor may be an encoder. For example, the rotation sensor may be a proximity sensor for measuring the numbers of teeth of the transmission gear 14.

The technical scope of the present invention is not limited to the embodiments described above but is susceptible of various modification within the purport of the present invention.

For example, the foregoing description of the embodiments is based on an example in which the speed reducing device is a gear transmission device including a status monitoring device for a speed reducer, but this is not limitative. For example, the present invention may be applied to a speed reducing device other than the gear transmission device. For example, the present invention may be applied to a status monitoring device for a speed reducer, instead of the speed reducing device. In this case, the status monitoring device for a speed reducer may include a signal transmission unit and a determination unit. The signal transmission unit monitors the status of a crankshaft of the speed reducer and transmits a status signal, and the determination unit determines the status of the speed reducer based on the status signal from the signal transmission unit.

The foregoing description of the first and second embodiments is based on an example in which the determination unit calculates a plurality of signal differences based on the first signal, the second signal, and the third signal, and puts out a fault possibility signal when any one of the plurality of signal differences is equal to or larger than the threshold, but this is not limitative. For example, the determination unit may calculate a plurality of signal differences based on the first signal, the second signal, and the third signal, and put out a fault possibility signal when any two of the plurality of signal differences are equal to or larger than the threshold. For example, the timing for putting out the fault possibility signal may be changed in accordance with required specifications.

The foregoing description of the embodiments is based on an example in which each of the signal transmission units is provided on the corresponding crankshaft, but this is not limitative. For example, the signal transmission unit may be provided on a member other than the crankshaft. In this case, the status monitoring device for a speed reducer may be used for a speed reducer including a first member and a second member having the same shape, and the status monitoring device may include a first signal transmission unit for monitoring the status of the first member and transmitting a first signal, a second signal transmission unit for monitoring the status of the second member and transmitting a second signal, and a determination unit for determining the status of the speed reducer by comparing the first signal with the second signal.

The elements of the embodiments described above may be replaced with known elements within the purport of the present invention. Further, the modifications described above may be combined.

What is claimed is:

1. A status monitoring device for an eccentric oscillating type speed reducer, comprising:
   a plurality of signal transmission units configured to monitor a status of a plurality of crankshafts of the speed reducer and to transmit respectively a status signal of each of the plurality of crankshafts; and
   a determination unit configured to determine a status of the speed reducer by comparing the plurality of status signals from the plurality of signal transmission units,
   wherein the plurality of signal transmission units configured to monitor the status of the plurality of crankshafts arranged at same distance from a central axis of the speed reducer to a central axis of each of the plurality of crankshafts, and the plurality of crankshafts have a same shape and interlock with each other to operate in a same operation as each other.

2. The status monitoring device for the eccentric oscillating type speed reducer according to claim 1, wherein the plurality of signal transmission units are configured to transmit the status signals representing at least one of vibration, noise, temperature, and rotation of the plurality of crankshafts.

3. The status monitoring device for the eccentric oscillating type speed reducer according to claim 1, wherein the determination unit is configured to perform at least one of fault detection, life forecast, and fault prediction based on the plurality of status signals.

4. The status monitoring device for the eccentric oscillating type speed reducer according to claim 1, wherein the plurality of crankshafts comprises a first crankshaft, a second crankshaft, and a third crankshaft,
   wherein the plurality of signal transmission units include:
      a first signal transmission unit provided on the first crankshaft and configured to monitor a status of the first crankshaft and to transmit a first signal as one of the plurality of status signals;
      a second signal transmission unit provided on the second crankshaft and configured to monitor a status of the second crankshaft and to transmit a second signal as one of the plurality of status signals; and
      a third signal transmission unit provided on the third crankshaft and configured to monitor a status of the third crankshaft and to transmit a third signal as one of the plurality of status signals, and
   wherein the determination unit is configured to calculate a plurality of signal differences based on the first signal, the second signal, and the third signal, and to transmit a fault possibility signal when any one of the plurality of signal differences is equal to or larger than a threshold.

5. The status monitoring device for the eccentric oscillating type speed reducer according to claim 1, wherein the plurality of crankshafts comprises a first crankshaft, a second crankshaft, and a third crankshaft,
   wherein the plurality of signal transmission units include:
      a first signal transmission unit provided on the first crankshaft and configured to monitor a status of the first crankshaft and to transmit a first signal as one of the plurality of status signals;
      a second signal transmission unit provided on the second crankshaft and configured to monitor a status of the second crankshaft and to transmit a second signal as one of the plurality of status signals; and
      a third signal transmission unit provided on the third crankshaft and configured to monitor a status of the third crankshaft and to transmit a third signal as one of the plurality of status signals, and
   wherein the determination unit is configured to calculate a plurality of signal differences based on the first signal, the second signal, and the third signal, and to transmit a fault possibility signal when any two of the plurality of signal differences are equal to or larger than a threshold.

6. A speed reducing device comprising:
   a casing;
   an eccentric oscillating type speed reducer disposed in an inner space of the casing; and
   a status monitoring device configured to monitor a status of the speed reducer,
   wherein the speed reducer include a plurality of crankshafts that are arranged at same distance from a central axis of the speed reducer to a central axis of each of the plurality of crankshafts, and have a same shape and interlock with each other to operate in a same operation as each other,
   wherein the status monitoring device include:
      a plurality of signal transmission units configured to monitor a status of the plurality of crankshafts and to transmit respectively a status signal of each of the plurality of crankshafts; and
      a determination unit configured to determine a status of the speed reducer by comparing the plurality of status signals from the plurality of signal transmission units.

7. A speed reducing device comprising:
   a casing;
   an eccentric oscillating type speed reducer disposed in an inner space of the casing;
   a status monitoring device configured to monitor a status of the speed reducer,
   wherein the speed reducer include a first crankshaft, a second crankshaft, and a third crankshaft that have a same shape and interlock with each other to operate in a same operation as each other,
   wherein the status monitoring device include:
      a plurality of signal transmission units configured to monitor a status of the first crankshaft, the second crankshaft and the third crankshaft and to transmit respectively a status signal of each of the first crankshaft, the second crankshaft, and the third crankshaft; and a determination unit configured to determine a status of the speed reducer by comparing the plurality of status signals from the plurality of signal transmission units, wherein the plurality of signal transmission units include:

a first signal transmission unit provided on the first crankshaft and configured to monitor vibration of the first crankshaft and to transmit a first signal as one of the plurality of status signals;

a second signal transmission unit provided on the second crankshaft and configured to monitor vibration of the second crankshaft and to transmit a second signal as one of the plurality of status signals; and a third signal transmission unit provided on the third crankshaft and configured to monitor vibration of the third crankshaft and to transmit a third signal as one of the plurality of status signals, and wherein the determination unit is configured to calculate a plurality of signal differences based on the first signal, the second signal, and the third signal, and to transmit a fault possibility signal when any one of the plurality of signal differences is equal to or larger than a threshold.

8. A speed reducing device comprising:

a casing;

an eccentric oscillating type speed reducer disposed in an inner space of the casing;

a status monitoring device configured to monitor a status of the speed reducer, wherein the speed reducer include a first crankshaft, a second crankshaft, and a third crankshaft that have a same shape and interlock with each other to operate in a same operation as each other, wherein the status monitoring device include:

a plurality of signal transmission units configured to monitor a status of the first crankshaft, the second crankshaft and the third crankshaft and to transmit respectively a status signal of each of the first crankshaft, the second crankshaft, and the third crankshaft; and a determination unit configured to determine a status of the speed reducer by comparing the plurality of status signals from the plurality of signal transmission units, wherein the plurality of signal transmission units include:

a first signal transmission unit provided on the first crankshaft and configured to monitor temperature of the first crankshaft and to transmit a first signal as one of the plurality of status signals;

a second signal transmission unit provided on the second crankshaft and configured to monitor temperature of the second crankshaft and to transmit a second signal as one of the plurality of status signals; and a third signal transmission unit provided on the third crankshaft and configured to monitor temperature of the third crankshaft and to transmit a third signal as one of the plurality of status signals, and wherein the determination unit is configured to calculate a plurality of signal differences based on the first signal, the second signal, and the third signal, and to transmit a fault possibility signal when any one of the plurality of signal differences is equal to or larger than a threshold.

9. A speed reducing device comprising:

a casing;

an eccentric oscillating type speed reducer disposed in an inner space of the casing;

a status monitoring device configured to monitor a status of the speed reducer, wherein the speed reducer include a first crankshaft, a second crankshaft, and a third crankshaft that have a same shape and interlock with each other to operate in a same operation as each other, wherein the status monitoring device include:

a plurality of signal transmission units configured to monitor a status of the first crankshaft, the second crankshaft and the third crankshaft and to transmit respectively a status signal of each of the first crankshaft, the second crankshaft, and the third crankshaft; and a determination unit configured to determine a status of the speed reducer by comparing the plurality of status signals from the plurality of signal transmission units, wherein the plurality of signal transmission units include:

a first signal transmission unit provided on the first crankshaft and configured to monitor rotation of the first crankshaft and to transmit a first signal as one of the plurality of status signals;

a second signal transmission unit provided on the second crankshaft and configured to monitor rotation of the second crankshaft and to transmit a second signal as one of the plurality of status signals; and a third signal transmission unit provided on the third crankshaft and configured to monitor rotation of the third crankshaft and to transmit a third signal as one of the plurality of status signals, and wherein the determination unit is configured to transmit a fault possibility signal in accordance with a condition of variation of the first signal, the second signal, and the third signal.

* * * * *